2 Sheets—Sheet 1.

F. H. POETSCH.

METHOD OF AND APPARATUS FOR SINKING SHAFTS, &c., THROUGH QUICKSAND AND OTHER WATER BEARING STRATA.

No. 10,541. Reissued Dec. 9, 1884.

WITNESSES:

F. H. Rosenbaum.

Earl Kash

INVENTOR

F. Hermann Poetsch

BY

Gopel & Raegener

ATTORNEYS.

2 Sheets—Sheet 2.

F. H. POETSCH.

METHOD OF AND APPARATUS FOR SINKING SHAFTS, &c., THROUGH QUICKSAND AND OTHER WATER BEARING STRATA.

No. 10,541. Reissued Dec. 9, 1884.

WITNESSES:

F. H. Rosenbaum.

Carl Kapp

INVENTOR

F. Hermann Poetsch

BY

Gopel & Raegener

ATTORNEYS.

UNITED STATES PATENT OFFICE.

F. HERMANN POETSCH, OF ASCHERSLEBEN, PRUSSIA, GERMANY.

METHOD OF AND APPARATUS FOR SINKING SHAFTS, &c., THROUGH QUICKSAND AND OTHER WATER-BEARING STRATA.

SPECIFICATION forming part of Reissued Letters Patent No. 10,541, dated December 9, 1884.

Original No. 300,891, dated June 24, 1884. Application for reissue filed October 30, 1884. Patented in England May 29, 1883, No. 2,655; in France May 30, 1883, No. 155,769; in Belgium May 31, 1883, No. 61,550; in Luxemburg June 2, 1883, No. 289; in Italy June 20, 1883, No. 15,556—54; in Austria-Hungary July 19, 1883, No. 21,174 and No. 31,702; in Denmark November 8, 1883, No. 1,305; in Spain November 16, 1883, No. 3,418, and in Sweden December 3, 1883.

*To all whom it may concern:*

Be it known that I, F. HERMANN POETSCH, of Aschersleben, in the Kingdom of Prussia, German Empire, have invented certain new useful Improvements in Methods of and Apparatus for Sinking Shafts, &c., through Quicksand and other Water-Bearing Strata, (for which Letters Patent have heretofore been granted to me by the following governments: Belgium, No. 61,550, dated May 31, 1883; Luxemburg, No. 289, dated June 2, 1883; France, No. 155,769, dated May 30, 1883; Great Britain, No. 2,655, dated May 29, 1883; Austria-Hungary, No. 21,174 and No. 31,702, dated July 19, 1883; Italy, No. 15,556—54, dated June 20, 1883; Spain, 3,418, dated November 16, 1883; Sweden, dated December 3, 1883; Denmark, No. 1,305, dated November 8, 1883,) of which the following is a specification.

The invention relates to a novel method of and apparatus for sinking shafts through quicksand and other water-bearing strata, and for carrying on boring and other operations in the same; and the invention consists, first, in artificially freezing a portion of said quicksand or water-bearing strata and the like and then cutting or boring into or through the ground so frozen.

The invention consists, secondly, of an apparatus for freezing the quicksand or other water-bearing strata and the like, which apparatus is composed of a series of freezing-pipes driven or placed through or into said strata, and means by which a refrigerating medium is circulated in said pipes, so that the quicksand or other water-bearing strata may be frozen by the refrigerating action of the same.

The invention consists, further, of certain details of construction, which will be more fully described hereinafter, and finally pointed out in the claims.

Figure 1:
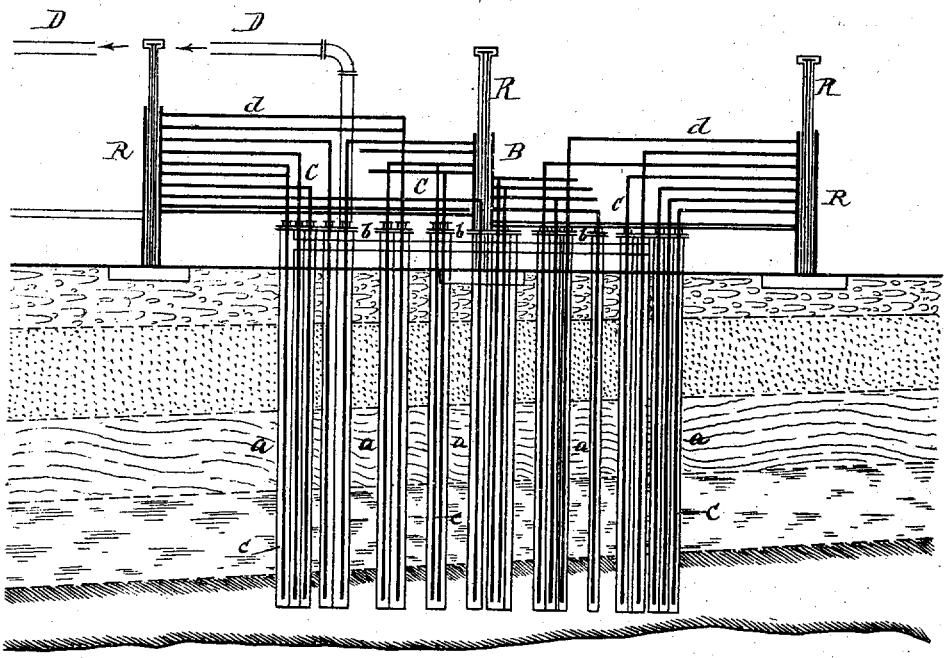
Figure 2:
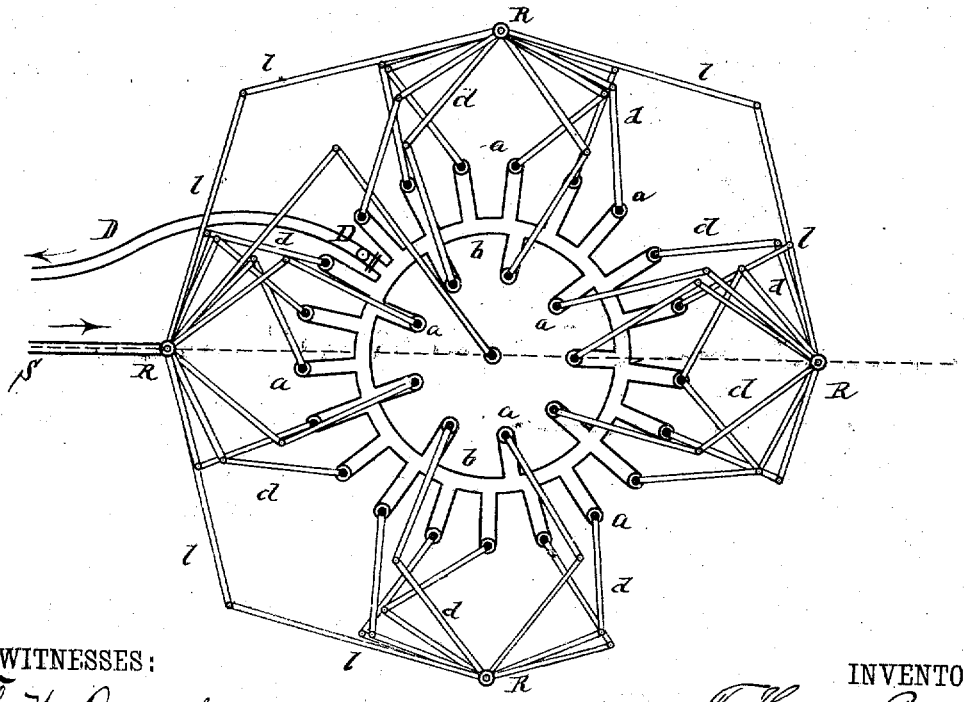
Figure 3:
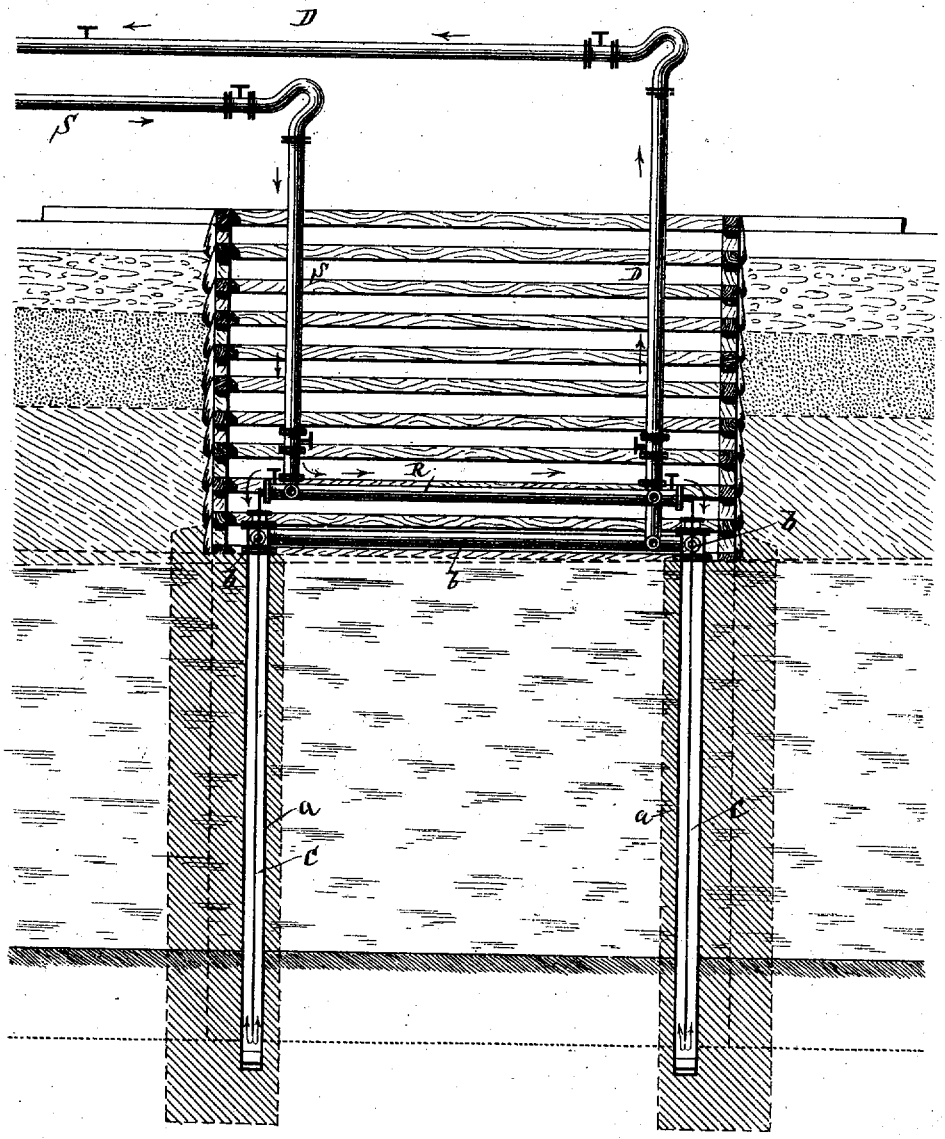

In the accompanying drawings, Figure 1 represents a side elevation of an apparatus for freezing the quicksand or other water-bearing strata. Fig. 2 is a plan of the same; and Fig. 3 is a vertical transverse section of a freezing apparatus drawn on a larger scale, and with the freezing-pipes arranged to form a circular ice-wall through or into the quicksand.

Similar letters of reference indicate corresponding parts.

Figure 1 shows in section a series of strata to be bored or drilled through or otherwise excavated, including a layer of quicksand. A series of pipes, *a*, which are closed at one end and placed at proper distances from each other, are sunk through the water-bearing quicksand and connected with one or more receiving-pipes, *b*. Pipes *c* are inserted into the pipes *a*, and extended to near the closed end of the same, one end of pipes *c* being open. These pipes *c*, as shown in Figs. 1 and 2, are connected with manifolds R by pipes *d*. The manifolds R are connected by pipes *l*, and have a common supply-pipe, S.

D is a return-pipe connected to the receiving-pipe *b*.

The supply-pipe S is connected to a refrigerating-machine of any approved construction, by which the cold liquid or gas is supplied and conducted to the manifolds R, and thence through the pipes *d* and *c* into the pipes *a*, which pass through or into the strata to be frozen, the liquid or gas being returned through the pipes *b* and D to the refrigerating-machine. By these means a continuous circulation of a freezing medium is established through the pipes driven through, into, or about the water-bearing strata, which strata are thereby frozen to a sufficient thickness to form a solid block, so that the operations of boring, drilling, or excavating may be carried on through or in said frozen block in the same manner as in ordinary solid ground. The number and arrangement of the freezing-pipes *a*, and the consequent thickness to which the ground will be frozen, depend on local circumstances, and more especially on the lateral pressure of the ground. As a circulating and freezing medium cold air, or chilled solution of chloride of calcium, or liquid ammonia, which through its evaporation within the pipes abstracts heat, or any other suitable heat-abstracting medium, may be used, the circulation being established in the usual manner.

Fig. 3 shows a section through a series of strata through the upper part of which a shaft is sunk and timbered to near the top of the water-bearing quicksand. It also shows the freezing-tubes *a* driven through the quicksand with the internal tubes, *c*. The tubes *a* receive the freezing medium through pipes *e* from a circular manifold, R, and a supply-pipe, S. The pipes *a* are connected by an annular pipe, *b*, the freezing medium passing from it to the return-pipe D. The drawings show the body of the water-bearing strata frozen in the shape of a circular wall, through the interior of which the excavating operations are carried on. The solid wall is held in frozen condition until the shaft is lined entirely and finished in masonry or other permanent material.

It is evident that this system of freezing may be applicable to any cross-section and slope of shaft, and to all analogous operations which have to be carried on in such quicksand or in water-bearing strata and the like.

The freezing medium and the arrangement of the freezing apparatus may be varied and adapted to the nature of the work to be performed.

Having thus described my invention, I claim as new and desire to secure by Letters Patent—

1. The method of perforating strata of quicksand or other water-bearing strata, which consists in freezing a portion of said strata by artificial means, and then proceeding with the perforating operation through said frozen portion, substantially as set forth.

2. The method herein described of sinking shafts and making excavations in quicksand and other water-bearing strata, which consists in driving freezing-pipes through said strata, next freezing a portion of said strata by circulating a refrigerating medium through said pipes, and then proceeding with the excavating operations through or within the frozen strata, substantially as set forth.

3. An apparatus for freezing quicksand or other water-bearing strata, consisting of a series of freezing-pipes driven through said strata, and means for circulating a refrigerating medium through said pipes, substantially as set forth.

4. An apparatus for freezing quicksand and other water-bearing strata, consisting of a series of freezing-pipes driven through said strata, means for supplying a freezing medium to said pipes, and means for returning it from the same to the source of supply, substantially as described.

5. The combination of a series of exterior pipes closed at the ends and driven through water-bearing or other strata, a series of pipes within said exterior pipes and open at the ends, and means for circulating a freezing medium through said pipes, substantially as and for the purposes specified.

6. The combination of a series of exterior pipes closed at their ends and driven through water-bearing or other strata, a series of pipes within said exterior pipes and open at their ends, means for supplying a refrigerating medium to the interior pipes, and means and appliances for returning said medium from the exterior pipes to the source of supply, substantially as described.

7. The combination of a series of exterior pipes driven through water-bearing or other strata and closed at the ends, a series of pipes within said exterior pipes and open at the ends, manifolds connected to the exterior pipes, a receiving-pipe connected to the exterior pipes, means whereby a refrigerating medium is supplied to said manifolds, and means whereby said medium is returned from the receiving-pipe to the source of supply, substantially as set forth.

In testimony that I claim the foregoing as my invention I have signed my name in presence of two subscribing witnesses.

F. HERMANN POETSCH.

Witnesses:
B. ROI,
M. S. BREWER.